April 30, 1963  M. LOOMIS  3,087,178
ADJUSTABLE LOADING DOCK
Filed July 16, 1959  2 Sheets-Sheet 1

INVENTOR.
MARTIN LOOMIS

ATTORNEYS

April 30, 1963  M. LOOMIS  3,087,178
ADJUSTABLE LOADING DOCK
Filed July 16, 1959  2 Sheets-Sheet 2

INVENTOR.
MARTIN LOOMIS
BY
ATTORNEYS

United States Patent Office 3,087,178
Patented Apr. 30, 1963

3,087,178
ADJUSTABLE LOADING DOCK
Martin Loomis, 133 E. 4th St., Claire, Mich.
Filed July 16, 1959, Ser. No. 827,643
2 Claims. (Cl. 14—71)

This invention pertains to adjustable loading docks of the kind wherein a dock is provided with a movable ramp which is adapted to bridge any gap existing between the front edge of the dock and a vehicle to be loaded or unloaded at the dock. More particularly, the invention relates to a dock construction having a ramp member which is swingable from a raised position to a lowered position, and return, and including means operable automatically to maintain the ramp in either of its positions of adjustment. Moreover, the invention is concerned with a dock construction of the kind referred to wherein the lip or front end of the ramp member is adapted to be supported at varying levels.

Loading docks of the general class to which the invention relates are well known per se and include ramp or bridge members which are of such length that they project forwardly of the front end of the dock so as to serve as a bridge to span a gap between the dock and a vehicle at the dock to be loaded or unloaded. Since the forward edge of the ramp projects beyond the dock, care must be taken to prevent injury to the ramp when a vehicle to be loaded or unloaded approaches the dock, in order to prevent damage to the ramp by the vehicle. This hazard may be overcome quite effectively by mounting the ramp member for swinging movements such that the forward end of the ramp may be lifted above the load or load carrying bed of the vehicle and, if desired, the ramp may be capable of swinging to such positions that its lip is located wholly rearwardly of the front end of the dock. In such constructions, some kind of counterbalancing means should be provided to overcome to some extent the weight of the ramp member so as to facilitate its being swung. With such constructions, however, the counterbalance usually exerts a constant moment of force on the ramp so as always to bias the latter either to its raised or its lowered position. If the ramp is to be capable of resting, by itself, in the position to which it is not normally biased, some other means must be provided to complement either the weight of the ramp or the counterbalance means.

Loading ramps of the general class to which the invention appertains preferably should be so constructed that they may rest at a level corresponding substantially to the level of the dock itself during periods of inactivity of the ramp. The purpose of such a construction is to permit cross traffic over the ramp, thereby making the ramp, in effect, a usable part of the loading platform. It is not sufficient, however, that the ramp be lowerable only to a dock level position inasmuch as it frequently happens that the load carrying bed of a vehicle is substantially lower than the level of the loading dock. When a vehicle of this kind is to be loaded or unloaded at the dock, it is necessary that the leading end of the ramp be lowerable to a level below the level of the loading platform so as to avoid there being a vertically extending gap between the vehicle bed and the ramp. In this connection, it is important that the ramp, when in its lowered position, be biased to move downwardly so as to permit the ramp to adjust as the load carrying bed of the vehicle adjusts while being loaded.

Loading ramps which have the advantageous characteristics referred to above have been proposed heretofore in constructions having an operating member engaged by the vehicle to be loaded or unloaded as it moves towards the ramp. Examples of such constructions are disclosed in co-pending applications Serial Nos. 575,012 and 734,352, filed March 30, 1956, and May 9, 1958, now Patent No. 2,994,894 and No. 2,972,762, respectively. While such vehicle actuated mechanisms operate quite efficiently in those instances where there is sufficient room for a vehicle to back directly towards a dock, such apparatus cannot be used to best advantage where the clear space in front of the dock is insufficient to allow a vehicle to back straight towards the dock. Moreover, such constructions may not be utilized in the loading and unloading of railroad cars.

An object of this invention is to provide a loading dock construction having an adjustable ramp which is swingable from a lowered to a raised position, and return, and which is provided with means automatically operable as the ramp approaches either of its positions to bias the ramp to remain in that position.

Another object of the invention is to provide a loading ramp of the character referred to which selectively may be supported in its lowered position either in a dock level position or in some other position.

A further object of the invention is to provide an adjustable loading ramp which is manually adjustable to its varying positions of adjustment.

Other objects and advantages of the invention will be pointed out specifically or will become apparent from the following description when it is considered in conjunction with the appended claims and the accompanying drawings, in which:

Figure 2:
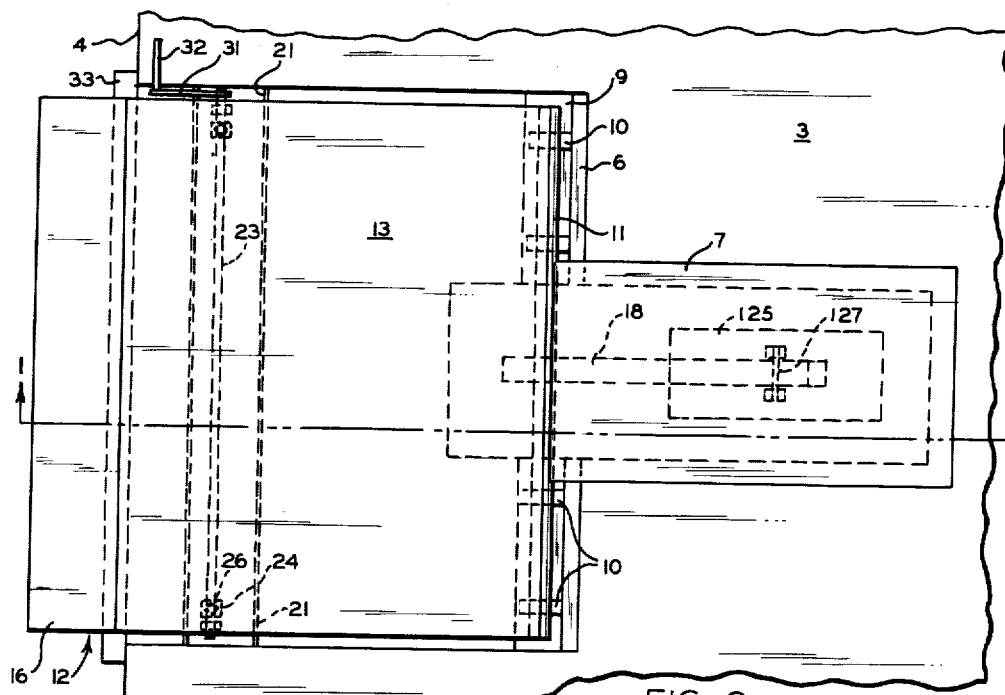
FIGURE 2 is a fragmentary, top plan view of a loading dock equipped with a ramp constructed in accordance with the invention.

An adjustable loading platform formed in accordance with the invention is designated generally by the reference character 1 and comprises a concrete or other loading dock 2 having a generally horizontal load supporting surface 3 and a front wall 4 extending vertically above a driveway 4a or the like. The dock 2 may be provided with a pit 5, the upper edges of which are bounded by suitable angle or similar frame members 6 on which is supported a cover 7 to form a smooth coninuation of the dock surface 3. The upper edge of the front wall 4 of the loading dock terminates at a level substantially lower than the level of the platform surface 3 and provides a step-down supporting surface 8 for a purpose presently to be explained.

Adjacent to the forward end of the pit 5 and at the rear end of the supporting surface 8 is mounted a pair of spaced, aligned channel or other suitable structural members 9. Mounted on the channel members 9 is a corresponding pair of trunnion blocks 10 which rotatably receive a cylindrical shaft 11 that spans the pit 5 and is welded or otherwise suitably fixed to the rear end of a ramp or platform member designated generally by the reference character 12.

In a preferred construction, the ramp 12 is formed of a pair of spaced, generally parallel plates 13 and 14 between which are mounted lateral reinforcing bars 15 and side bars 15a. At its forward end, the upper plate 13 is provided with an extension or lip portion 16 suitably reinforced by means of gussets 17 or the like and which slopes angularly towards the plane of the lower plate 14. At its rearward end, the lower plate 14 is provided with a rearwardly extending tongue 14a located over the pit 5 and to which is welded to otherwise suitably fixed one end of a counterweight supporting lever 18.

Figure 1:
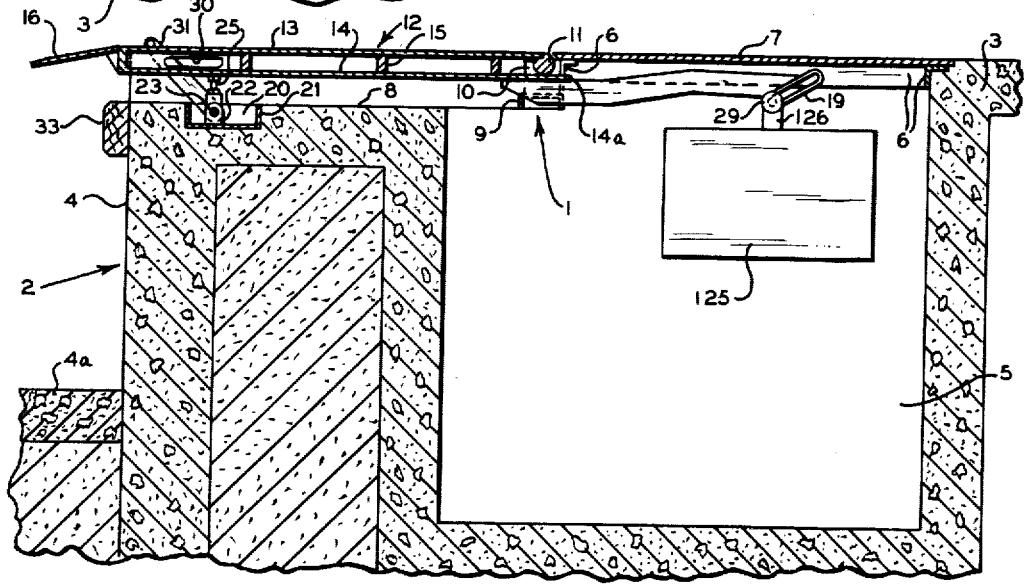
FIGURE 1 is a view partly in side elevation and partly in section and showing the loading ramp in its lowered, dock level position, the section being taken on the line 1—1 of FIGURE 2.
Figure 3:
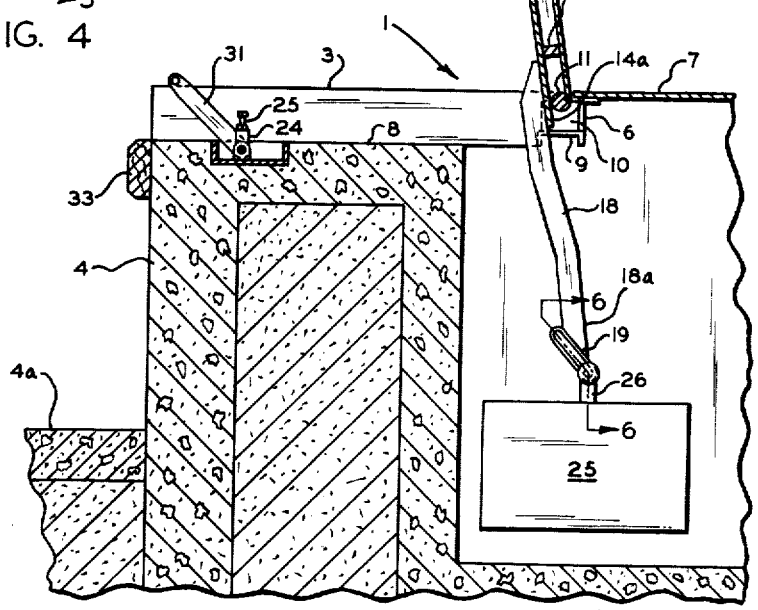
FIGURE 3 is a fragmentary view similar to FIGURE 2, but showing the loading ramp in its raised position.

The counterweight supporting lever 18 extends a substantial distance rearwardly of the loading ramp 12 and is capable of swinging through substantially 90° without interference, due to the fact that the supporting channel members 9 do not extend fully across the pit 5. At its rear end, the lever arm 18 is welded or otherwise suitably secured to a connection device comprising generally ellipitcal slide member 19. As is indicated in FIGURES 1 and 3, the rear portion 18a of the lever arm 18 is straight and the arrangement of the straight portion 18a and the slide member 19 is such that the major axis of the latter makes an acute angle with the longitudinal axis of the portion 18a. In the disclosed embodiment, the acute angle is substantially 30°. As also is illustrated in FIGURES 1 and 3, the length of the slide 19 is such that the slide extends beyond both side edges of the lever. The reason for this construction will be pointed out subsequently.

Near the forward end of the step-down supporting surface 8 is provided a recess 20 in which is mounted a supporting channel member 21 or the like. To the base of the supporting member 21 is welded or otherwise suitably secured a plurality of upstanding ears or lugs 22 in which is journaled a rock shaft 23 that spans the width of the ramp 12. Adjacent to each end of the rock shaft 23 is welded or otherwise suitably fixed a socket member 24 in which is threadedly received a correspondingly threaded supporting foot 25 having a head 26 at its free end and which is adapted to be positioned in the path of downward swinging movement of the loading ramp 12 so as to engage the lower plate 14 and prevent further downward movement of the ramp. Each of the feet 25 is adjustable vertically and each may be maintained in a selected position of adjustment by means of a lock nut 27.

Figure 5:
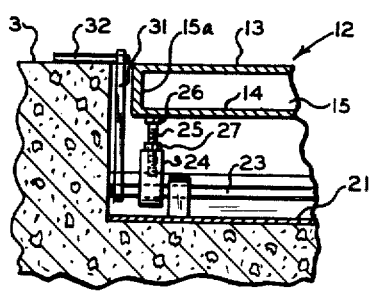
FIGURE 5 is a sectional view taken on the line 5—5 of FIGURE 4.
Figure 4:
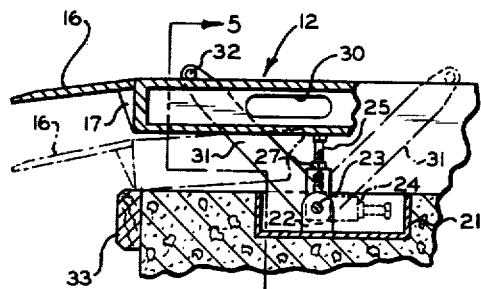
FIGURE 4 is a sectional, enlarged detail of a portion of the apparatus shown in FIGURES 1, 2, and 3.

When the supporting feet 25 are in the positions indicated in FIGURES 1, 3, and 5, and in the full line position indicated in FIGURE 4, and the supporting feet are properly adjusted, the upper surface of the ramp 12 will be substantially in the plane of the upper surfaces 3 of the dock and the pit cover 7 so that the ramp forms, in effect, a portion of the dock and permits cross traffic over the dock.

Figure 6:
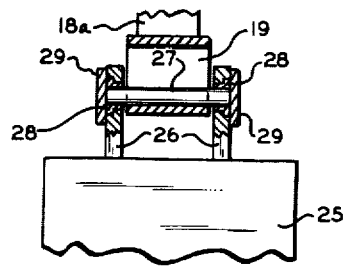
FIGURE 6 is a sectional view taken on the line 6—6 of FIGURE 3.

It will be apparent from the foregoing description that the ramp member 12 is hinged or pivoted at its rear end for swinging movement about the axis of the shaft 11. In order to counterbalance to some extent the weight of the ramp, a counterweight 125 is mounted on the counterweight supporting arm 18. The counterweight includes a pair of upright posts 126, each of the posts having aligned openings therein in which a bail or shaft 127 is mounted by means of suitable bearings 28. The ends of the shaft 127 are equipped with caps 29 to prevent longitudinal shifting of the shaft. As is perhaps best illustrated in FIGURE 6, the bail 127 is received within the slide member 19 and is capable of movement from one end of the latter to the other. The length of the lever arm 18, the weight of the counterweight 125, and the length of the slide member 19 are so related to the length and weight of the ramp member 12 that, when the ramp is in its lowered position as indicated in FIGURE 1, the bail 127 is at one extreme end of the slide member 19 and the weight of the ramp 12 slightly overbalances the weight of the counterweight so that gravity exerts a net force on the ramp tending to maintain it in its lowered position. In other words, the moment of force exerted by the counterweight is incapable of completely overcoming the weight of the ramp. The force exerted on the ramp by gravity, however, is not so great that the latter cannot be lifted manually with ease, and to facilitate lifting of the ramp, hand holes 30 are provided in the side members 15a.

When the ramp is elevated to the position shown in FIGURE 3, the counterweight 125 will shift relatively to the slide 19 so that it is suspended from the opposite end of the slide 19. In these positions of the parts, the effective length of the lever 18 has been increased by an amount such that the moment of force exerted on the ramp by the counterweight somewhat overbalances the weight of the ramp 12 and a net force is exerted on the ramp tending to maintain it in its elevated position. Again, however, the force exerted on the ramp is not so great as to hinder manual swinging of the ramp to its lowered position.

When the apparatus is in condition for operation, the ramp may be either in its lowered or raised position. If in its lowered position, the supporting feet 25 should be so adjusted that the ramp 12 is in substantially dock level position. When the ramp is to be utilized as a bridge between the dock and a vehicle to be loaded and unloaded, the ramp may be swung to an elevated position so as to permit the vehicle to approach the dock without fear of damaging the lip 16. As the ramp swings to its raised position, the counterweight shifts automatically in its lost motion slide 19 so as to bias the ramp to its elevated position, thereby avoiding the necessity of keeping a workman on duty at the ramp. When the vehicle is in place, the ramp may be swung to its lowered position and the length of the lip 16 should be sufficient to enable it to bridge any gap which exists between the vehicle to be unloaded and the leading end of the dock. As the ramp moves to its lowered position, the counterweight again shifts in its lost motion slide so as to shorten, in effect, the arm 18 and permit the ramp to remain in its lowered position by gravity.

Should the load carrying bed of the vehicle be located at a level higher than the level of the dock 3, the lip of the ramp will rest on the floor of the vehicle and the ramp will be inclined upwardly from the dock to the vehicle bed. Should the bed of the vehicle be located at a level lower than the level of the dock, however, it is necessary to remove the supporting feet 25 from the path of downward movement of the ramp so as to permit the latter to assume a position which is inclined downwardly from the dock towards the vehicle bed. Removal of the supporting feet 25 from the path of the ramp may be effected quite simply by swinging a lever 31 through 90° in a clockwise direction from the position shown in full lines in FIGURE 4 to the chain line position shown in FIGURE 4. The lever 31 is rigidly mounted on the rock shaft 23 so that movement of the lever is accompanied by corresponding movement of the shaft 23 and, consequently, rocking movement of the supporting foot structure. To facilitate swinging of the lever 31, the latter is provided with a handle 32 which overlies the dock surface 3 so as to be readily accessible and also to prevent swinging of the lever 31 through an arc greater than 90°. When the supporting foot structure has been swung from the full line position shown in FIGURE 4 to the chain line position, the ramp member 12 is capable of downward swinging movement because of the lower level of the surface 8 to the chain line showing in FIGURE 4 so as to slope downwardly towards the vehicle bed and permit the lip 16 to rest on the bed of the vehicle.

The mounting of the counterweight 125 on its supporting lever arm 18 is such that the major axis of the slide 19 assumes a substantially horizontal position when the ramp has been swung to a position substantially halfway between the limits of its upper and lower positions. Consequently, the counterweight will not shift relatively to its supporting slide 19 from either of its positions at the ends of the slide 19 until such time as the ramp member 12 has been swung from one of its positions more than halfway towards its other position. As a result, the ramp can partake of some swinging movement at either of its upper or lower positions without shifting of the counterweight.

Apparatus constructed in accordance with the invention is adapted for use in conjunction with railroad cars, trucks, and other load carrying vehicles. Since it is adapted for use with trucks, it is preferable that a wood or other type bumper 33 be provided at the front edge of the dock to prevent damaging of the dock by a truck backing into the latter. The bumper 33 also provides a support on which the ramp may rest in its extreme lowered position so as to prevent injuring the upper surface 8 of the dock by the ramp and vice versa.

During periods of inactivity of the loading ramp, the latter may be maintained either in the dock level position shown in FIGURE 1 or in a raised position as is shown in FIGURE 3. When the ramp is in its dock level position, the counterweight 125 will be suspended from the lever arm 18 at the forward end of the member 19, inasmuch as the member 19 is inclined forwardly and downwardly. Consequently, the moment of force exerted on the ramp by the counterweight will be incapable of overcoming the weight of the ramp and the latter will remain in its dock level position.

When it is desired to raise the ramp from its dock level position, the ramp may be swung upwardly about the axis of the pivot shaft 11 so as to cause corresponding swinging of the lever 18. As the ramp and the lever rock, the slide 19 will be moved so that its inclination gradually will change from the downward and forward inclination shown in FIGURE 1 to the downward and rearward inclination shown in FIGURE 3. As the inclination of the member 19 changes, the counterweight 125 will shift from the position shown in FIGURE 1 to a position where it is suspended from the rearward end of the slide 19, thereby increasing the effective length of the lever arm 18, whereupon the moment of force exerted on the ramp member by the counterweight is capable of overcoming the weight of the ramp member and maintaining the latter in its raised position.

The differences in the biasing effects exerted by the counterweight can be achieved without great shifting movements of the counterweight, and it is not necessary that the counterweight be shifted from a position rearwardly of the pivot shaft 11 to a position forwardly of the pivot shaft. That is, the counterweight may at all times remain at one side of the pivotal mounting of the ramp 12, as is indicated in FIGURES 1 and 3.

The disclosed embodiment is representative of a presently preferred form of the invention, but is intended to be illustrative rather than definitive thereof. The invention is defined in the claims.

What is claimed is:

1. An adjustable loading dock construction comprising a generally planar ramp member pivotally mounted at its rear end for swinging movement between raised and lowered positions; lever means substantially parallel to said ramp member and connected at one of its ends to said ramp member beneath the latter for swinging movement therewith, the other end of said lever means extending rearwardly of said ramp member beyond the pivotal mounting of the latter; a counterweight for exerting a moment of force on said ramp member in either of said positions of the latter; and counterweight mounting means at the other end of said lever means, said mounting means comprising a slide member disposed at an upward and rearward inclination to said lever means when said ramp member is in its lowered position and slideably supporting said counterweight for shifting of the latter in directions generally fore and aft of said ramp member in response to swinging movement of said ramp member, said counterweight being slideable from a forward position in which the moment exerted by said counterweight is incapable of urging said ramp member to its raised position, to a rearward position in which the moment exerted by said counterweight urges said ramp member to its raised position 2. The construction set forth in claim 1 including support means pivotally mounted adjacent the forward end of said ramp member for pivotal movement from a first position in the path of lowering movement of the latter to engage and support said ramp member in a lowered position, to a second position in which said support means is out of the path of lowering movement of said ramp member; and means connected to said support means for pivoting the latter to and from said positions.

References Cited in the file of this patent

UNITED STATES PATENTS

| | | |
|---|---|---|
| 628,850 | Rathvon | July 11, 1899 |
| 1,024,059 | Brintnall | Apr. 23, 1912 |
| 1,120,505 | Johnson | Dec. 8, 1914 |
| 1,160,506 | Goss | Nov. 16, 1915 |
| 1,405,433 | Peterson | Feb. 7, 1922 |
| 2,560,064 | Astry | July 10, 1951 |
| 2,650,847 | Olson | Sept. 1, 1953 |

UNITED STATES PATENT OFFICE
CERTIFICATE OF CORRECTION

Patent No. 3,087,178                  April 30, 1963

Martin Loomis

It is hereby certified that error appears in the above numbered patent requiring correction and that the said Letters Patent should read as corrected below.

In the grant, lines 1 to 3, for "Martin Loomis, of St. Clai Michigan", read -- Martin Loomis, of Clare, Michigan, --; in the heading to the printed specification, line 3, for "Martin Loomis 133 E. 4th St., Claire, Mich." read -- Martin Loomis, 133 E. 4th St., Clare, Mich.

Signed and sealed this 5th day of November 1963.

(SEAL)
Attest:

ERNEST W. SWIDER
Attesting Officer

EDWIN L. REYNOLDS
Acting Commissioner of Patents